H. W. COMSTOCK.
Scale Weights.
No. 70,531.
Patented Nov. 5, 1867.
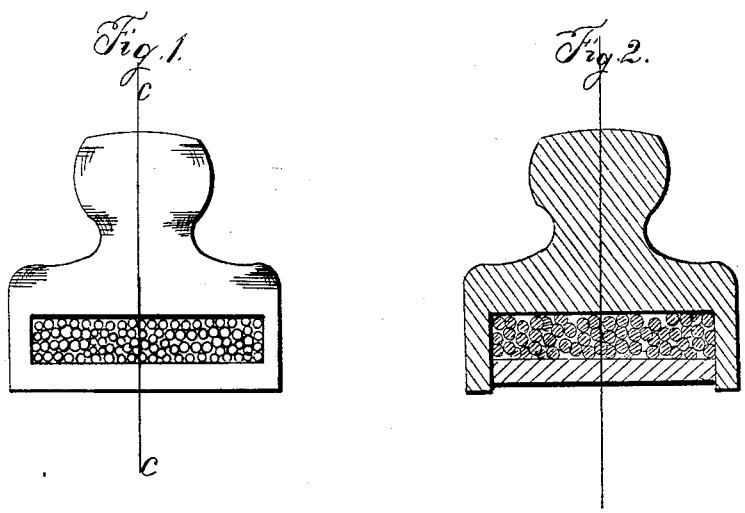
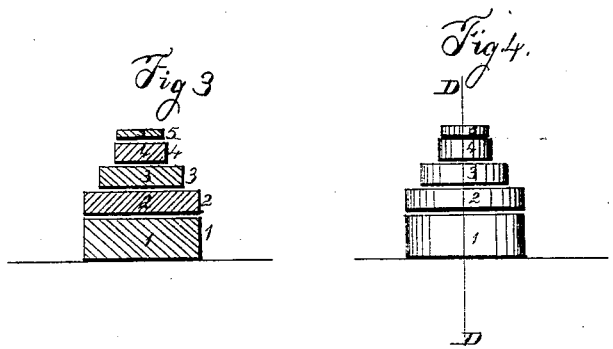
Witnesses:
Jno. L. Pettit
J. M. Dresser
Inventor:
H. W. Comstock

United States Patent Office.

H. W. COMSTOCK, OF LAFAYETTE, INDIANA.

Letters Patent No. 70,531, dated November 5, 1867.

IMPROVEMENT IN WEIGHTS FOR SCALES.

The Schedule referred to in these Letters Patent and making part of the same.

Be it known that I, H. W. COMSTOCK, of the city of Lafayette, county of Tippecanoe, and State of Indiana, have invented and discovered a new and useful Material of which Weights for Apothecaries' and other Scales may be manufactured, whereby the cost is greatly diminished, and loss and diminution of weight by means of corrosion entirely prevented; and I do hereby declare that the following is a full, clear, and accurate description thereof, reference being had to the accompanying drawings, of which—

Figure 1 is a perspective view of several sizes of glass weights.

Figure 2, end view of the same, and

Figure 3 a sectional elevation thereof.

My invention consists in using for small weights, on druggists' and other scales, disks of solid glass, from one-fourth of a pound to the smallest weight in use. In weights of one-fourth of a pound and upward I use a hollow cup of glass, which may be filled with shot or any substance suitable to afford the required weight, which is secured to its place by a bottom or stopper made to fit the aperture, and secured by cement or in any other suitable manner.

A, fig. 3, shows a glass weight so filled. B C D, &c., show the empty weights. A, fig. 1, also shows the filled weight, while B C D E, &c., may represent the solid weights.

Therefore what I claim as my invention, and desire to secure by Letters Patent, is—

The substitution of glass in place of other substances as weights for weighing-scales, thereby producing an anti-corrosive and cheaper weight, as specified.

I also claim a filled glass weight, when so constructed that the material used as filling shall be entirely surrounded by the glass, as specified and described.

H. W. COMSTOCK.

Witnesses:
   J. H. DURHAM,
   JNO. CONNOLLY, Jr.